UNITED STATES PATENT OFFICE.

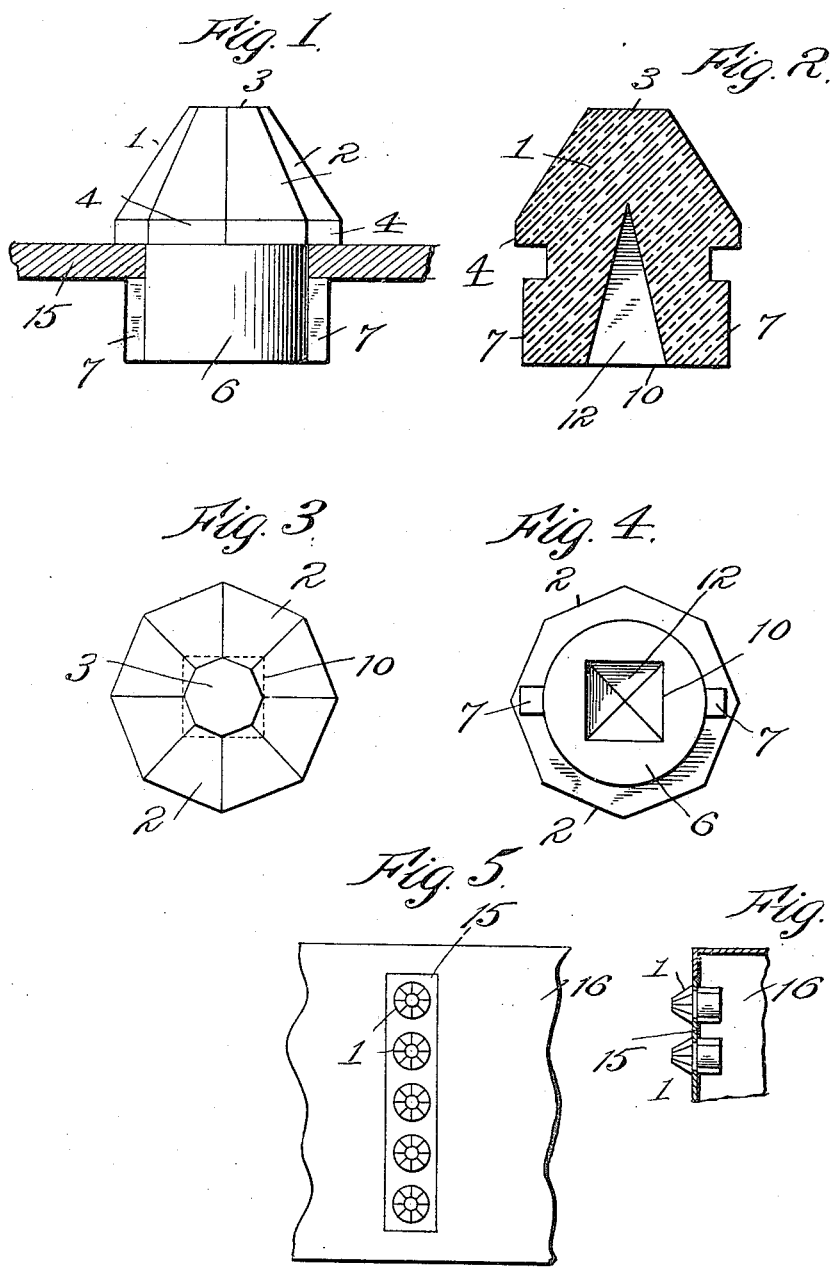

ARTHUR S. PLOWMAN, OF RIVERDALE, AND RONALD C. DAISLEY, OF BROOKLYN, NEW YORK.

ILLUMINATING-LENS.

1,205,258.

Specification of Letters Patent.

Patented Nov. 21, 1916.

Application filed March 10, 1914. Serial No. 823,725.

*To all whom it may concern:*

Be it known that we, ARTHUR S. PLOWMAN and RONALD C. DAISLEY, citizens of the United States, and residents, respectively, of Riverdale, county of Bronx, and State of New York, and Brooklyn, county of Kings, and State of New York, have invented certain new and useful Improvements in Illuminating-Lenses, of which the following is a specification.

This invention relates in general to lenses and particularly to the class of lenses employed in illuminating letters, figures and the like, in signs, display advertising and such devices as are used to attract attention.

The object of the invention is to make a lens having interior and exterior reflecting surfaces so arranged relatively to each other, that light rays will be readily gathered and transmitted in a desirable manner. This result is obtained by making a lens with a plurality of exterior reflecting surfaces and a plurality of interior reflecting surfaces, less in number than the exterior surfaces.

The preferred construction of the lenses is shown in the accompanying drawings in which:

Figure 1 is an elevation of the lens; Fig. 2 is a vertical section of the same; Fig. 3 is a plan view of the lens; Fig. 4 is a bottom view of the lens; Fig. 5 is a portion of a sign showing how several lenses are arranged to illuminate a letter, and Fig. 6 is a cross section of a portion of a letter and the light box.

Similar numerals indicate like parts throughout the several figures.

1 is the body of the lens having a frustum shaped head which is provided with a plurality of exterior reflecting surfaces 2. The shape of the head of the lens being that of the frustum of a pyramid an additional reflecting surface 3 is provided. The base of the frustum has parallel vertical sides as shown at 4, for the purpose of preventing the edges of the frustum from breaking or chipping when the lens is fastened to a frame, holder or the like. The shank or reduced portion of the lens is shown at 6 and is preferably made cylindrical so that it can be more readily made to adjust itself to the frame or holder 15, to which it is to be attached. In order to retain the lens in proper position, lugs 7 are placed on the sides of the shank in the manner shown in the drawings. These lugs may be of any desired shape or style and the manner of having them engage and hold the frame or holder is not essential to the invention. In Figs. 5 and 6 it is clearly shown how the lenses are attached to the letters or the like when it is desired to illuminate the same.

15 is the frame, holder or letter which receives the lens and holds it in position, said frame, holder or letter being part of a light box 16 which contains the illuminating medium.

Extending upwardly from the base and through the shank into the head of the lens is a recess 10. This recess has a plurality of sides or reflecting surfaces 12, all of which converge from the opening in the shank to a point within the head of the lens and act as interior reflecting surfaces to aid in transmitting the light through the lens. By having the number of exterior reflecting surfaces in excess of the interior reflecting surfaces, a better transmission of light for illuminating purposes is presented. Of course, it should be understood that the exact number of exterior reflecting and interior reflecting surfaces is not material.

The essential feature of the present invention is a lens formed preferably in the shape of a frustum of a pyramid, and provided with a plurality of exterior reflecting surfaces and a recess extending longitudinally into the body of the lens and converging at a point within the side walls of said recess, forming a plurality of interior reflecting surfaces, less in number than the exterior reflecting surfaces. In the present form of lens the best results have been obtained by having the interior reflecting surfaces one-half in number to the exterior reflecting surfaces, and having said interior surfaces arranged in uniform angular relation to the exterior surfaces, preferably as shown in the drawings. The desired angular relation of the interior and exterior reflecting surfaces can be maintained, whatever the number of said surfaces may be, so long as the interior reflecting surfaces are one-half in number to the exterior reflecting surfaces.

In making small lenses, approximately one-half inch in diameter and smaller, the best results have been obtained by having flat interior reflecting surfaces less in number than the outer reflecting surfaces, so that the light rays will be more readily gathered. By having each interior surface cover two exterior surfaces, the light rays multiply and by the angular relation of the interior and exterior surfaces, refraction is increased because the angle of refraction is the angle which a ray of light refracted, makes with a perpendicular to that point of the surface of the refracting medium on which it falls. By using the frustum of a pyramid the transverse or end reflecting surface 3 will destroy the dark spot now present in lenses of this type.

Of course, it is obvious that certain details of contour proportions and design can be varied without departing from the spirit of the invention.

We claim:

1. An illuminating lens comprising a hollow frustum of a pyramid, having a plurality of interior and exterior reflecting surfaces, the interior reflecting surfaces being one-half the number of the exterior reflecting surfaces and arranged in uniform angular relation to said exterior reflecting surfaces.

2. An illuminating lens, comprising a body portion having a plurality of exterior reflecting surfaces, and a longitudinal recess in said body, the walls of which form the interior reflecting surfaces and are one-half in number of the exterior reflecting surfaces.

ARTHUR S. PLOWMAN.
RONALD C. DAISLEY.

Witnesses:
WM. A. COURTLAND,
HOWARD H. DAISLEY,

Copies of this patent may be obtained for five cents each, by addressing the "Commissioner of Patents, Washington, D. C."